United States Patent
Yanagisawa

(10) Patent No.: US 11,051,537 B2
(45) Date of Patent: Jul. 6, 2021

(54) LIQUID SEASONING

(71) Applicant: KEWPIE CORPORATION, Tokyo-to (JP)

(72) Inventor: Takuya Yanagisawa, Tokyo (JP)

(73) Assignee: KEWPIE CORPORATION, Tokyo-To (JP)

( * ) Notice: Subject to any disclaimer, the term of this patent is extended or adjusted under 35 U.S.C. 154(b) by 0 days.

(21) Appl. No.: 16/642,988

(22) PCT Filed: Aug. 31, 2017

(86) PCT No.: PCT/JP2017/031491
§ 371 (c)(1),
(2) Date: Feb. 28, 2020

(87) PCT Pub. No.: WO2019/043894
PCT Pub. Date: Mar. 7, 2019

(65) Prior Publication Data
US 2020/0305480 A1    Oct. 1, 2020

(51) Int. Cl.
*A23L 27/00* (2016.01)
*A23L 27/20* (2016.01)
*A23L 25/00* (2016.01)
*A23L 31/10* (2016.01)
*A23L 29/00* (2016.01)

(52) U.S. Cl.
CPC ............... *A23L 27/20* (2016.08); *A23L 25/00* (2016.08); *A23L 29/03* (2016.08); *A23L 31/10* (2016.08)

(58) Field of Classification Search
CPC .......... A23L 27/30; A23L 31/10; A23L 29/03; A23L 25/00
See application file for complete search history.

(56) References Cited

FOREIGN PATENT DOCUMENTS

| JP | 2007-014252 | 1/2007 | | |
|---|---|---|---|---|
| JP | 2008-154474 | 7/2008 | | |
| JP | 2008-154476 | 7/2008 | | |
| RU | 2567027 | 10/2015 | | |
| WO | WO-2014208396 A1 | * 12/2014 | ............. | A23L 27/60 |
| WO | 2015/014607 | 2/2015 | | |

OTHER PUBLICATIONS

JP 2008154474 machine translation. 2008.*
Burdock, G.A. 2005. Fenaroli's handbook of flavor ingredients. 5th Ed. CRC Press. Boca Raton, FL.*
Shimoda, M., Shiratsuchi, H., Nakada, Y., Wu, Y., Osajima, Y. 1996. "Identification and Sensory Characterization of Volatile Flavor Compounds in Sesame Seed Oil." J. Agric. Food Chem. vol. 44, pp. 3909-3912.*
Sha, S. et al. 2017. "Characterization of the Typical Potent Odorants in Chinese Roasted Sesame-like Flavor Type Liquor by Headspace Solid Phase Microextraction-Aroma Extract Dilution Analysis, with Special Emphasis on Sulfur-Containing Odorants." J. Agric. Food Chem. vol. 65, pp. 123-131.*
Tamura et al. 2011. "Assessment of the Aroma Impact of Major Odor-Active Thiols in Pan-Roasted White Sesame Seeds by Calculation of Odor Activity Values." J. Agric. Food Chem. vol. 59, p. 10211-10218.*
Tamura et al. 2010. "Identification of Novel Aroma-Active Thiols in Pan-Roasted White Sesame Seeds." J. Agric. Food Chem. vol. 58, pp. 7368-7375.*
WO 2014208396 machine translation. 2014.*
JP 2008154476 machine translation. 2008.*
International Search Report dated Nov. 14, 2017 in International (PCT) Application No. PCT/JP2017/031491.
International Preliminary Report on Patentability dated Mar. 12, 2020 in International (PCT) Patent Application No. PCT/JP2017/031491.
Written Opinion of the International Searching Authority dated Nov. 14, 2017 in International (PCT) Application No. PCT/JP2017/031491, with English translation.
Namiki et al., "3.5 Sesame Aroma Components", Sesame Science, 1989, pp. 143-155.
Ikeda et al., "Flavor design of sesame-flavored dressing using gas chromatography/olfactometry and Food *Kansei* Model", Food Sci. Technol. Res., Nov. 2006, vol. 12, No. 4, pp. 261-269.
Takeda et al., "Odor-Active Components in Ground Roasted Sesame Seeds", The Japanese Journal of Taste and Smell Research, 2008, vol. 15, No. 3, pp. 629-630.
Kawakami, "The Aroma of Roasted Sesame Seeds", The Takasago Times, Sep. 1997, No. 127, pp. 19-24.
Tamura, "Sesame Aroma Components", Hasegawa Lett., Oct. 2014, No. 33, pp. 32-37.
Notification of Reasons for Revocation of Patent dated Apr. 24, 2019 in corresponding Japanese Patent Application No. 2018-513397 (Japanese Patent No. 6353623), with English Translation.
Office Action dated Nov. 19, 2020 in corresponding Russian Patent Application No. 2020112284, with English Translation.
Office Action dated Nov. 30, 2020 in corresponding Australian Patent Application No. 2017429743.

* cited by examiner

*Primary Examiner* — Nikki H Dees
(74) *Attorney, Agent, or Firm* — Wenderoth, Lind & Ponack, L.L.P.

(57) ABSTRACT

[Problem] To provide a sesame-containing liquid seasoning which has an enhanced aroma unique to sesame and also has an original aroma which is irresistible and addictive.
[Solution] The present invention is a liquid seasoning containing sesame, including a linear alkanethiol and a dimethylpyrazine which is at least one of 2,5-dimethylpyrazine and 2,6-dimethylpyrazine, wherein the ratio of the peak area of the linear alkanethiol to the peak area of the dimethylpyrazine is 0.05 or more and less than 1.0 when the aroma components of the liquid seasoning are measured by solid phase microextraction-gas chromatography mass spectrometry. Such a liquid seasoning shows an enhanced aroma unique to sesame and an original aroma which is irresistible and addictive.

9 Claims, No Drawings

LIQUID SEASONING

TECHNICAL FIELD

The present invention relates to a liquid seasoning, and more particularly, to a sesame-containing liquid seasoning which has an enhanced aroma unique to sesame and also has an original aroma which is irresistible and addictive.

BACKGROUND ART

Sesame-flavored liquid seasonings in which sesame is used as an ingredient such as sesame dressing, sesame mayonnaise, and sesame sauce have been on the market. This liquid seasoning is obtained by adding ground sesame, chopped sesame or the like to a seasoning liquid and mixing them uniformly, and is a seasoning characterized by its aroma unique to sesame. Such sesame-flavored liquid seasonings have been used not only as a salad dressing, but also as a sauce for tofu, meat, and the like. In recent years, sesame-flavored liquid seasonings have been more often used for meals.

Although freshly made liquid seasonings including sesame as an ingredient are delicious, a problem is that the aroma unique to sesame tends to disappear easily over time after a long-term storage. As a conventional technique for maintaining or enhancing the aroma unique to sesame, for example, a sesame fragrance for acidic seasonings in which sesame aroma is encapsulated in a capsule formed from a film of a specific material has been proposed (see Patent Document 1) as a technique for maintaining the aroma of the sesame fragrance for a long time.

PRIOR ART DOCUMENTS

Patent Documents

Patent Document 1: JP 2007-14252 A

SUMMARY OF THE INVENTION

Problems to be Solved by the Invention

However, the technique described in Patent Document 1 was accompanied by a complicated and expensive production method, and it was hardly enough to satisfy the demands of consumers.

In recent years, the inventors have eagerly pursued a new and original flavor that provokes consumers' appetite. As a result, it has been found that a new and original flavor that provokes consumers' appetite cannot be obtained simply by maintaining the natural scent of sesame in a liquid seasoning for a long period of time.

Therefore, one object of the present invention is to provide a sesame-containing liquid seasoning which not only maintains the natural scent of sesame in the liquid seasoning for a long period of time, but also has an original aroma which is irresistible and addictive for consumers.

Solutions to the Problems

The present inventors conducted intensive studies to solve the above problems. Even if each of a linear alkanethiol or a dimethylpyrazine was independently contained in the sesame-containing liquid seasoning, an original aroma which was irresistible and addictive was not provided. However, the inventors have surprisingly found that the combination of a linear alkanethiol and a dimethylpyrazine at a specific ratio or in a specific amount in a sesame-containing liquid seasoning enhances the aroma unique to sesame and produces an original aroma which is irresistible and addictive. The present invention has been completed based on such finding.

Specifically, according to the first aspect of the present invention, a liquid seasoning containing sesame, comprising,
a linear alkanethiol and a dimethylpyrazine which is at least one of 2,5-dimethylpyrazine and 2,6-dimethylpyrazine,
wherein the ratio of the peak area of the linear alkanethiol to the peak area of the dimethylpyrazine is 0.05 or more and less than 1.0 when the aroma components of the liquid seasoning are measured by solid phase microextraction-gas chromatography mass spectrometry, is provided.

In addition, according to the second aspect of the present invention, a liquid seasoning containing sesame, comprising
a linear alkanethiol and a dimethylpyrazine which is at least one of 2,5-dimethylpyrazine and 2,6-dimethylpyrazine,
wherein the content of the linear alkanethiol is 40 ppb or more and 500 ppb or less with respect to the total amount of the liquid seasoning, is provided.

In the second aspect of the present invention, the content of the dimethylpyrazine is preferably 10 ppb or more and 800 ppb or less with respect to the total amount of the liquid seasoning.

In the first aspect and second aspect of the present invention, the ratio of the peak area of the linear alkanethiol to the peak area of the dimethylpyrazine is preferably 0.06 or more and 0.8 or less when the aroma components of the liquid seasoning are measured by solid phase microextraction-gas chromatography mass spectrometry.

In the first aspect and second aspect of the present invention, the content of the linear alkanethiol is preferably 50 ppb or more and 400 ppb or less with respect to the total amount of the liquid seasoning, and the content of the dimethylpyrazine is preferably 50 ppb or more and 500 ppb or less with respect to the total amount of the liquid seasoning.

In the first aspect and second aspect of the present invention, the content of the sesame is preferably 1 to 40% by mass with respect to the total amount of the liquid seasoning.

In the first aspect and second aspect of the present invention, the liquid seasoning is preferably oil-in-water emulsified liquid seasoning.

In the first aspect and second aspect of the present invention, the liquid seasoning preferably contains further a yeast extract.

In the first aspect and second aspect of the present invention, the content of the yeast extract is preferably 0.01 to 2% by mass with respect to the total amount of the liquid seasoning.

In the first aspect and second aspect of the present invention, the content of the yeast extract (% by mass)/the total content (ppb) of the linear alkanethiol and the dimethylpyrazine is preferably 0.00005 to 0.01.

Effects of the Invention

The liquid seasoning of the present invention contains a linear alkanethiol and a dimethylpyrazine at a specific ratio or in a specific amount. Their interaction with the aroma of sesame results in an enhanced aroma unique to the sesame and an original aroma which is irresistible and addictive.

Consequently, a consumer's appetite can be induced, and the further expansion of the market of the processed food in which the sesame-containing liquid seasoning is blended can be anticipated.

DESCRIPTION OF EMBODIMENTS

<Liquid Seasoning>

The liquid seasoning containing sesame of the present invention contains the following specific aroma components. Depending on the type of the liquid seasoning, the liquid seasoning containing sesame of the present invention may further contain an acid material such as acetic acid, seasonings such as soy sauce, sugar and miso, edible fat, an emulsifier, and other raw materials. The liquid seasoning of the present invention has an enhanced aroma unique to sesame and also has an original aroma which is irresistible and addictive by containing the following aroma components in combination at a specific ratio or in a specific amount.

<Aroma Components>

The liquid seasoning of the present invention contains a linear alkanethiol and a dimethylpyrazine at a specific ratio or in a specific amount. In the present invention, such a balance of these aroma components in the sesame-containing liquid seasoning can result in an enhanced aroma unique to sesame and an original aroma which is irresistible and addictive. The liquid seasoning of the present invention contains an aroma component which is usually contained in a normal sesame-containing liquid seasoning in addition to the linear alkanethiol and the dimethylpyrazine, and may further contain other aroma components as long as the effects of the present invention are not impaired.

Preferred examples of the linear alkanethiol include alkanethiols of an alkane having 1 to 6 carbon atoms, that is, methanethiol, ethanethiol, propanethiol, butanethiol, pentanethiol, and hexanethiol. Among these, methanethiol, ethanethiol, propanethiol, and butanethiol are more preferred, methanethiol and ethanethiol are more preferred, and methanethiol is particularly preferred. Only one type of these linear alkanethiols may be contained, or two or more types thereof may be contained. When two or more types of linear alkanethiols are contained, the peak area and content as described below are the total value of all the linear alkanethiols. Methanethiol and ethanethiol alone have an irritating odor similar to the smell of onions and the like.

In the present invention, dimethylpyrazines refer to 2,5-dimethylpyrazine and 2,6-dimethylpyrazine, and both components have similar scents. In the liquid seasoning, only one type of these may be contained as a dimethylpyrazine, or two types of these may be contained. When both 2,5-dimethylpyrazine and 2,6-dimethylpyrazine are contained, the peak area and content as described below are the total value of the both.

In the liquid seasoning of the present invention, when the aroma components are measured by solid phase microextraction-gas chromatography mass spectrometry which will be described in detail below, the ratio of the peak area of the linear alkanethiol to the peak area of the dimethylpyrazine (the peak area of the linear alkanethiol/the peak area of the dimethylpyrazine) is preferably 0.05 or more and less than 1.0, more preferably 0.06 or more and 0.8 or less, and still more preferably 0.07 or more and 0.5 or less. When the ratio of the peak area of the linear alkanethiol to the peak area of the dimethylpyrazine is within the above range, the aroma unique to sesame is enhanced and the original aroma which is irresistible and addictive can be obtained in the liquid seasoning.

The content of the linear alkanethiol in the liquid seasoning is preferably 40 ppb or more and 500 ppb or less, more preferably 50 ppb or more and 400 ppb or less, further preferably 60 ppb or more and 300 ppb or less, and even more preferably 70 ppb or more and 200 ppb or less.

The content of the dimethylpyrazine in the liquid seasoning is preferably 10 ppb or more and 800 ppb or less, more preferably 50 ppb or more and 500 ppb or less, further preferably 80 ppb or more and 400 ppb or less, and even more preferably 100 ppb or more and 300 ppb or less.

When the content of the linear alkanethiol and that of the dimethylpyrazine are within the above respective ranges, the aroma unique to sesame is enhanced and the original aroma which is irresistible and addictive can be obtained in the liquid seasoning. The content of the linear alkanethiol and dimethylpyrazine in the liquid seasoning can be measured and calculated using gas chromatography according to a conventional method. For example, solid phase microextraction-gas chromatography mass spectrometry (SPME-GC-MS) can be used for the measurement.

The method for adjusting the ratio and content of the linear alkanethiol and the dimethylpyrazine in the liquid seasoning is not particularly limited. For example, a linear alkanethiol and a dimethylpyrazine are added individually as a fragrance to the liquid seasoning, or alternatively, food or a food additive containing a linear alkanethiol and a dimethylpyrazine may be added.

Even if the linear alkanethiol and the dimethylpyrazine are contained in the same amount in the liquid seasoning, the resulting peak areas are different due to the characteristics of solid-phase microextraction-gas chromatography mass spectrometry. One of the reasons for this is, for example, that the amounts of the two components volatilizing into the gas phase are different from each other due to the difference in volatility between the two components, the difference between the two components in affinity with other components in the sample, and the like. Furthermore, due to various factors from the characteristics of the measurement method, the ratio calculated from the peak areas is different from the ratio calculated from the quantitative values.

<Method of Measuring Aroma Components>

The aroma components of the liquid seasoning of the present invention can be measured using solid phase microextraction-gas chromatography mass spectrometry (SPME-GC-MS) in the following conditions.

<Analysis Conditions>

(1) Separation and concentration method of aroma components

Aroma components are separated and concentrated in accordance with a solid phase microextraction method using an SPME fiber and a device for extracting volatile components in the following conditions.

<Solid Phase Microextraction Conditions>

SPME fiber: a double-layer coating SPME fiber having a divinylbenzene-dispersed polydimethylsiloxane layer with a thickness of 50 μm on the outside and a Carboxen-dispersed polydimethylsiloxane layer with a thickness of 30 μm on the inside (product name: StableFlex 50/30 μm, DVB/Carboxen/PDMS (Sigma-Aldrich)).

Device for extracting volatile components: Combi PAL, manufactured by CTC Analitics Preheating: 40° C., 15 min Agitation speed: 300 rpm Volatile component extraction: 40° C., 20 min Desorption time: 10 min (2) Method of measuring aroma components Each peak area of the linear alkanethiol and of the dimethylpyrazine in the liquid seasoning is measured using gas chromatography and mass spectrometry in the following conditions. Samples containing a reference standard of a linear alkanethiol or that of a dimethylpyrazine are measured in the same manner to obtain gas chromatograms. The content of the linear alkanethiol and that of dimethylpyrazine in the liquid seasoning are determined from the peak areas of the linear alkanethiol and the dimethylpyrazine in the gas chromatogram thereof with reference to the gas chromatograms of the samples above described.

The quantitative ion mass of each component is as follows.

Quantitative ion mass of methanethiol, m/z 47
Quantitative ion mass of ethanethiol, m/z 62
Quantitative ion mass of butanethiol, m/z 56
Quantitative ion mass of propanethiol, m/z 76
Quantitative ion mass of 2,5-dimethylpyrazine, m/z 108
Quantitative ion mass of 2,6-dimethylpyrazine, m/z 108

<Gas Chromatography Conditions>

Measuring instrument: Agilent 6890N (manufactured by Agilent Technologies, Inc.)

Column: Capillary column having a liquid phase coating of polyethylene glycol having a film thickness of 0.25 µm on the inner wall formed of the column material; length of 30 m, inner diameter of 0.25 mm, film thickness of 0.25 µm (product name: SOLGEL-WAX (manufactured by SGE), length of 30 m, inner diameter of 0.25 mm, film thickness of 0.25 µm)

Temperature condition: holding at 35° C. (5 min)→rising the temperature to 120° C. at a rate of 5° C./min→rising the temperature to 220° C. at a rate of 15° C./min: holding at 6 min Carrier: He gas, gas flow rate: 1.0 mL/min Injection method: Pulsed splitless Splitless, holding for 1.5 min→purging 50 mL/min Pulse pressure, holding at 100 kPa for 1.6 min→47 kPa (At the Beginning)

Inlet temperature: 250° C.

Workstation MSD ChemStation Build 75 (Agilent Technologies, Inc.)

<Conditions for Mass Analysis>

Mass spectrometer: Quadrupole mass spectrometer (Product name: Agilent 5973N (manufactured by Agilent Technologies, Inc.))

Scan mass, m/z 29.0 to 290.0

Ionization method, EI (ionization voltage 70 eV)

If the signal intensity is low, the SIM (Selected Ion Monitoring) measurement may be performed instead of the scan measurement.

The measurement device is not limited to the above. For example, Agilent 7890B, Agilent 5977S, or the like may be used. It is possible to appropriately adjust the conditions according to the specifications of the measuring instrument to be used.

(Sesame)

The content of sesame used in the liquid seasoning of the present invention is not particularly limited as long as the liquid seasoning has an aroma unique to sesame, and is preferably 1 to 40% by mass, more preferably 2 to 30% by mass, and particularly preferably 3 to 15% by mass. When the content of the sesame is 1% by mass or more, a strong aroma unique to sesame can be obtained from the moment when the liquid seasoning is freshly made. When the content of the sesame is 40% by mass or less, the effect of enhancing the aroma unique to sesame can be more pronounced.

The sesame used in the present invention is not particularly limited, and examples of the raw sesame include white sesame, gold sesame, black sesame and brown sesame. Roasted sesame obtained by roasting such sesame by a conventional method is preferably used. Specific examples thereof include sesame obtained by roasting seeds with an outer seed coating in a direct-fired or far-infrared roasting kettle, and the like. The form of sesame used in the present invention is not particularly limited, and the sesame may be in the form of whole sesame, or may be pulverized with a stone mortar, colloid mill, food cutter, milder, roll pulverizer, or the like.

(Yeast Extract)

When a yeast extract is further included in the liquid seasoning of the present invention, the liquid seasoning has a further enhanced aroma unique to sesame and also has a further stronger original aroma which is irresistible and addictive. The yeast extract herein refers to an extract obtained by decomposing yeast as a raw material by, for example, self-digestion or enzyme addition. Examples of yeast as a raw material include so-called beer yeast, which is a surplus yeast produced as a by-product during beer production, baker's yeast used in bread making, torula yeast produced for alimentary use, sake yeast used during sake production, wine yeast used in wine production, and soy sauce yeast used in soy sauce production. Extracts of such yeast in powder forms, paste forms, and liquid forms are commercially available, and these commercially available products can be used.

The content of the yeast extract used in the liquid seasoning of the present invention is preferably 0.01 to 2% by mass, more preferably 0.05% by mass to 1.5% by mass, and particularly preferably 0.10% by mass to 1.0% by mass, in terms of dry weight. When the content of the yeast extract is within the above range, a further enhanced aroma unique to sesame and a further stronger original aroma which is irresistible and addictive can be obtained.

In the liquid seasoning of the present invention, the content of the yeast extract (% by mass)/the total content (ppb) of the linear alkanethiol and the dimethylpyrazine is preferably 0.00005 to 0.01, more preferably 0.0001 to 0.008, and further more preferably 0.0002 to 0.005. When the content of the yeast extract (% by mass)/the total content (ppb) of the linear alkanethiol and dimethylpyrazine is within the above range, a further enhanced aroma unique to sesame and a further stronger original aroma which is irresistible and addictive can be obtained.

(Acetic Acid)

The liquid seasoning of the present invention can include acetic acid to be prepared as an acidic liquid seasoning. Even if the pH of the liquid seasoning of the present invention is lowered to emphasize the acidity, the effect of retaining the aroma of sesame can be obtained, and thus, the liquid seasoning of the present invention can exhibit its effects at a lower pH. The pH is preferably from 3.0 to 6.5, more preferably from 3.3 to 5.5, and particularly preferably from 3.8 to 4.6. When the pH is 3.0 or more, the aroma of sesame can be maintained even if the acidity is emphasized. When the pH is 6.5 or less, the aroma of sesame can be accentuated due to the acidity.

The amount of acetic acid used in the liquid seasoning of the present invention is preferably 0.1 to 1% by mass, more preferably 0.2 to 0.9% by mass, and particularly preferably 0.4 to 0.8% by mass. When the amount of acetic acid used is 0.1% by mass or more, a synergistic effect thereof with the above-described specific aroma components is easily obtained. When the amount used is 1% by mass or less, the aroma of sesame can be provided while the acidity of acetic acid is not emphasized too much.

(Acid Material)

The liquid seasoning of the present invention may contain other acid materials in addition to acetic acid. Examples of the acid materials to be used include organic acids such as citric acid, malic acid, lactic acid, sorbic acid, benzoic acid, adipic acid, fumaric acid, and succinic acid, and salts thereof, inorganic acids such as phosphoric acid and hydrochloric acid, and salts thereof, lemon juice, apple juice, orange juice, and lactic acid fermented milk. The content of the acid material is not particularly limited and can be appropriately adjusted.

(Viscosity)

The viscosity of the liquid seasoning of the present invention is 0.1 to 1000 Pa·s, preferably 0.1 to 800 Pa·s, more preferably 0.3 to 800 Pa·s. When the liquid seasoning has a viscosity of 0.1 Pa·s or more and 1000 Pa·s, the tongue can perceive more the adhesiveness of the sesame-containing liquid seasoning. Then, when the aroma unique to sesame rises in the nasal cavity (oral aroma) after the liquid seasoning is placed on the tongue, the sweet scent of roasted sesame and the scent of roasted sesame which is freshly grounded can be perceived more due to the synergistic effect of the adhesiveness perceived by the tongue with the above-mentioned aroma components.

(Oil-in-Water Emulsified Liquid Seasoning)

The liquid seasoning of the present invention is preferably oil-in-water emulsified liquid seasoning. By emulsifying and dispersing edible fat to encapsulate the aroma components of the present invention in oil droplets, the sweet scent of roasted sesame and the scent of roasted sesame which is freshly ground can be enhanced.

The oil-in-water emulsified liquid seasoning is, for example, obtained by mixing an acid material such as acetic acid or citric acid and an emulsifier such as starch, a gum, egg yolk, and sucrose fatty acid ester with pure water, adding fat thereto while stirring the mixture in a mixer or the like to coarsely emulsifying the resulting mixture, and then homogenizing the resulting mixture with a processing machine having excellent shearing force.

(Edible Fat)

The amount of fat used in the liquid seasoning of the present invention may be an amount that allows the aroma components of the present invention to be encapsulated in oil droplets, and is preferably 1 to 70% by mass, more preferably 5 to 50% by mass, and particularly preferably 15 to 50% by mass.

The edible fat used in the present invention is not particularly limited. Specific examples thereof include rapeseed oil, soybean oil, palm oil, cottonseed oil, corn oil, sunflower oil, safflower oil, sesame oil, olive oil, linseed oil, rice oil, camellia oil, perilla oil, grape seed oil, peanut oil, almond oil, avocado oil, fish oil, beef tallow, pork tallow, chicken tallow, fats obtained by a chemical or enzymatic treatment such as MCT (medium chain triglyceride), diglyceride, hardened oil, and transesterified oil. Preferably, rapeseed oil, soybean oil or palm oil is contained, and more preferably palm oil is contained.

The method for measuring the edible fat is performed in accordance with the ether extraction method disclosed in "Analytical Methods and the like for Nutritional Components in Nutrition Labeling Standards" (Apr. 26, 1999, Eishin No. 13).

(Emulsifiers)

As the emulsifier used in the oil-in-water emulsified liquid seasoning of the present invention, egg yolk is preferably used. The amount of egg yolk used is preferably 0.1 to 20% by mass, and more preferably 0.1 to 5% by mass. When the amount of egg yolk used is 0.1% by mass or more, the oil-in-water emulsified liquid seasoning can sufficiently maintain the emulsified state. When the amount of egg yolk used is 20% by mass or less, the flavor of egg yolk is not too strong, and the aroma of sesame can be maintained. The amount of egg yolk used is calculated in terms of the liquid egg yolk as is obtained by cracking a chicken egg. Since the cholesterol content in liquid egg yolk is 1.4% by mass, the amount used can be measured in accordance with the cholesterol measurement method disclosed in "(1) Gas Chromatography Method" of Eishin No. 13 "4 Cholesterol" issued on Apr. 26, 1999 by the Japanese Ministry of Health, Labor and Welfare.

Furthermore, when edible fat is dispersed in an oil-in-water emulsified liquid seasoning, egg yolk treated with phospholipase A or dried egg yolk is preferably used as the above-mentioned egg yolk because the effect of suppressing the separation after a long-term storage and therefore the large effect of retaining the flavor are easily obtained.

(Other Raw Materials)

In addition to the raw materials mentioned above, various raw materials normally used for a liquid seasoning can be suitably selected for and contained in the liquid seasoning of the present invention as long as they do not impair the effects of the present invention. Examples thereof include seasonings such as soy sauce, mirin (sweet cooking sake), salt, sodium glutamate, and bouillon, sugars such as glucose, fructose, sucrose, maltose, oligosaccharides, and trehalose, spices such as mustard powder and pepper, emulsifiers such as lecithin, lysolecithin, glycerin fatty acid ester, polyglycerol fatty acid ester, sucrose fatty acid ester, and octenyl succinated starch, thickeners such as xanthan gum, carrageenan, guar gum, tamarind seed gum, locust bean gum, gellan gum, and gum arabic, antioxidants such as ascorbic acid, and vitamin E, and bacteriostatic agents.

EXAMPLES

The present invention will be described in detail by way of Examples and Comparative Examples, but is not limited thereto.

Production Example 1 of Liquid Seasoning

Examples 1 to 3 and Comparative Example 1

According to the formula as described below, a sesame-containing liquid seasoning of the present invention was produced. Specifically, soy sauce, vinegar, sugar, phospholipase A-treated egg yolk, guar gum, xanthan gum, roasted and ground sesame, a fragrance, and pure water were first introduced into a stirring tank and mixed uniformly to prepare an aqueous phase. Next, the obtained aqueous phase was put into a mixer, and then soybean oil as an oil phase was added thereto under stirring to carry out an emulsification treatment. Thus, an oil-in-water emulsified liquid seasoning containing sesame was prepared. Subsequently, a fragrance containing a linear alkanethiol (methanethiol) and dimethylpyrazines (2,5-dimethylpyrazine and 2,6-dimethylpyrazine) was added to the resulting oil-in-water emulsified liquid seasoning in the contents as described in Table 1. Thus, a sesame-containing liquid seasoning was prepared. 250 ml of the obtained sesame-containing liquid seasoning was filled into a PET container with a lid and the resulting container was sealed up to produce a sesame-containing liquid seasoning in a container. The viscosity of the obtained sesame-containing liquid seasoning was 0.8 Pa·s (20° C.).

<Formula of Sesame-Containing Liquid Seasoning>

| | |
|---|---|
| Soybean oil | 35% by mass |
| Soy sauce | 7% by mass |
| Vinegar (acidity 4%) | 15% by mass |
| Sugar | 10% by mass |
| Egg yolk treated with phospholipase A | 0.2% by mass |
| Guar gum | 0.2% by mass |
| Xanthan gum | 0.2% by mass |
| Roasted ground sesame | 5% by mass |
| Fragrance | appropriate amount |
| Pure water | balance |
| Total | 100% by mass |

(Measurement Method of Ratio of Peak Area of Linear Alkanethiol to Peak Area of Dimethylpyrazines)

The aroma components of the obtained sesame-containing liquid seasoning were measured by the solid phase microextraction-gas chromatography mass spectrometry method described in detail above. In the obtained chromatograph, the peak area of the linear alkanethiol and the peak area of the dimethylpyrazines were measured individually to calculate the ratio of the peak area of the linear alkanethiol to the peak area of the dimethylpyrazines, which is shown in Table 1.

(Method for Measuring Contents of Linear Alkanethiol and Dimethylpyrazines)

A sample was prepared by adding a certain amount of a reference standard of a linear alkanethiol to the obtained sesame-containing liquid seasoning. The aroma components of the sample were measured by the solid phase microextraction-gas chromatography mass spectrometry method described in detail above. The content of the linear alkanethiol was quantified from the peak area of the linear alkanethiol in the obtained gas chromatogram, which is shown in Table 1.

The content of the dimethylpyrazines was also quantified in the same manner as for the linear alkanethiol and is shown in Table 1.

<Sensory Evaluation of Liquid Seasoning>

The sesame-containing liquid seasoning in a container produced above was subjected to a sensory evaluation according to the following criteria by fully-trained panel members. The results of the sensory evaluation are as shown in Table 1.

[Evaluation Criteria]

5: The aroma unique to sesame was enhanced and an original aroma which was irresistible and addictive was strongly perceived.

4: The aroma unique to sesame was enhanced and an original aroma which was irresistible and addictive was perceived.

3: The aroma unique to sesame was somewhat enhanced and an original aroma which was irresistible and addictive was somewhat weakly but sufficiently perceived.

2: The aroma unique to sesame was hardly enhanced and an original aroma which was irresistible and addictive was hardly perceived.

1: The aroma unique to sesame was weak and an original aroma which was irresistible and addictive was not perceived at all.

TABLE 1

| | Components of liquid seasoning | | | |
|---|---|---|---|---|
| | Linear alkanethiol/ dimethyl- pyrazines | Linear alkanethiol content (ppb) | Dimethyl- pyrazines content (ppb) | Sensory evaluation of liquid seasoning |
| Example 1 | 0.091 | 150 | 300 | 5 |
| Example 2 | 0.094 | 70 | 125 | 5 |
| Example 3 | 0.066 | 60 | 150 | 4 |
| Comparative Example 1 | 0.032 | 30 | 150 | 2 |

Production Example 2 of Liquid Seasoning

Examples 4 to 12 and Comparative Examples 2 and 3

To 10 g of a commercial French dressing (French dressing (white) produced by Kewpie Corp.), 0.5 g of roasted and ground sesame and an appropriate amount of a fragrance were added. The resulting mixture was stirred until the mixture became homogeneous. Thus, an oil-in-water emulsified liquid seasoning containing sesame was prepared. Subsequently, a fragrance containing a linear alkanethiol (methanethiol) and dimethylpyrazines (2,5-dimethylpyrazine and 2,6-dimethylpyrazine) was appropriately added to the resulting oil-in-water emulsified liquid seasoning. Thus, a sesame-containing liquid seasoning was prepared. The obtained sesame-containing liquid seasoning was measured in the same manner as described above for the ratio of the peak area of the linear alkanethiol to the peak area of the dimethylpyrazines, and the content of the linear alkanethiol and the content of the dimethylpyrazines. Moreover, the sensory evaluation was performed in the same way as described above. The measurement results are shown in Table 2.

TABLE 2

| | Components of liquid seasoning | | | |
|---|---|---|---|---|
| | Linear alkanethiol/ dimethyl- pyrazines | Linear alkanethiol content (ppb) | Dimethyl- pyrazines content (ppb) | Sensory evaluation of liquid seasoning |
| Example 4 | 0.050 | 45 | 150 | 3 |
| Example 5 | 0.066 | 60 | 150 | 4 |
| Example 6 | 0.091 | 150 | 300 | 5 |
| Example 7 | 0.50 | 300 | 100 | 5 |
| Example 8 | 0.80 | 72 | 15 | 4 |
| Example 9 | 0.091 | 60 | 120 | 5 |
| Example 10 | 0.091 | 40 | 80 | 4 |
| Example 11 | 0.50 | 450 | 150 | 3 |
| Example 12 | 0.091 | 300 | 600 | 4 |
| Comparative Example 2 | 0.032 | 20 | 100 | 1 |
| Comparative Example 3 | 1.0 | 600 | 100 | 1 |

Production Example 3 of Liquid Seasoning

Examples 13 to 15

A sesame-containing liquid seasoning was obtained in the same manner as in Example 6 except that the type of the linear alkanethiol was changed. The obtained sesame-containing liquid seasoning was measured in the same manner as described above for the ratio of the peak area of the linear alkanethiol to the peak area of the dimethylpyrazines, and the content of the linear alkanethiol and the content of the dimethylpyrazines. Moreover, the sensory evaluation was performed in the same way as described above. The measurement results are shown in Table 3.

TABLE 3

| | | Components of liquid seasoning | | | |
|---|---|---|---|---|---|
| | Type of linear alkanethiol | Linear alkanethiol/ dimethylpyrazines | Linear alkanethiol content (ppb) | Dimethylpyrazines content (ppb) | Sensory evaluation of liquid seasoning |
| Example 13 | Ethanethiol | 0.091 | 150 | 300 | 4 |
| Example 14 | Propanethiol | 0.091 | 150 | 300 | 3 |
| Example 15 | Butanethiol | 0.091 | 150 | 300 | 3 |

According to the results of the above sensory evaluation, the sesame-containing liquid seasoning containing both of the linear alkanethiol and the dimethylpyrazines in a specific ratio or in specific amounts showed an enhanced aroma unique to sesame and an original aroma which was irresistible and addictive. On the other hand, even if the sesame-containing liquid seasoning contained both of a linear alkanethiol and dimethylpyrazines in the aroma components, the aroma unique to sesame was weak and the original aroma which was irresistible and addictive could not be obtained when the ratio or the contents of both in the aroma components was outside the specific range. Therefore, it was proved that, unexpectedly, by containing a linear alkanethiol and dimethylpyrazines at a specific ratio or in specific amounts in the aroma components, the sesame-containing liquid seasoning shows an enhanced aroma unique to sesame and an original aroma which was irresistible and addictive.

Production Example 4 of Liquid Seasoning

A sesame-containing liquid seasoning was obtained in the same manner as in Example 6 except that a commercially available yeast extract was added in a content as shown in Table 4 below. The obtained sesame-containing liquid seasoning was measured in the same manner as described above for the ratio of the peak area of the linear alkanethiol to the peak area of the dimethylpyrazines, and the content of the linear alkanethiol and the content of the dimethylpyrazines. The measurement results are shown in Table 4.

was irresistible and addictive was more strongly perceived, compared to the sesame-containing liquid seasoning obtained in Example 6, but the aroma unique to sesame and its original aroma were rather weakly perceived, compared to the sesame-containing liquid seasonings obtained in Examples 16 and 17.

The invention claimed is:

1. A liquid seasoning containing whole and/or pulverized sesame seed, comprising
a linear alkanethiol and a dimethylpyrazine which is at least one selected from the group consisting of 2,5-dimethylpyrazine and 2,6-dimethylpyrazine,
wherein the linear alkanethiol is methanethiol,
a ratio of a peak area of said linear alkanethiol to a peak area of said dimethylpyrazine is 0.06 or more and less than 1.0 when aroma components of said liquid seasoning are measured by solid phase microextraction-gas chromatography mass spectrometry,
a content of said linear alkanethiol is 40 ppb or more and 400 ppb or less with respect to a total amount of said liquid seasoning, and
a content of said dimethylpyrazine is 10 ppb or more and 800 ppb or less with respect to the total amount of said liquid seasoning.

2. The liquid seasoning according to claim 1,
wherein the ratio of the peak area of said linear alkanethiol to the peak area of said dimethylpyrazine is 0.06 or more and 0.8 or less when the aroma components of said liquid seasoning are measured by solid phase microextraction-gas chromatography mass spectrometry.

3. The liquid seasoning according to claim 1,
wherein the content of said linear alkanethiol is 50 ppb or more and 400 ppb or less with respect to the total amount of said liquid seasoning, and

TABLE 4

| | Linear alkanethiol/ dimethylpyrazines | Linear alkanethiol content (ppb) | Dimethylpyrazines content (ppb) | Yeast extract content (% by mass) | Yeast extract (% by mass)/ (methanethiol + dimethyl(ppb)) |
|---|---|---|---|---|---|
| Example 16 | 0.091 | 150 | 300 | 0.10 | 0.00022 |
| Example 17 | 0.091 | 150 | 300 | 0.50 | 0.0011 |
| Example 18 | 0.091 | 150 | 300 | 1.0 | 0.0022 |
| Example 19 | 0.091 | 150 | 300 | 2.0 | 0.0044 |

In the sensory evaluation of the sesame-containing liquid seasonings obtained in Examples 16 and 17, the aroma unique to sesame was further enhanced and an original aroma which was irresistible and addictive was more strongly perceived, compared to the sesame-containing liquid seasoning obtained in Example 6. Furthermore, in the sensory evaluation of the sesame-containing liquid seasonings obtained in Examples 18 and 19, the aroma unique to sesame was further enhanced and an original aroma which the content of said dimethylpyrazine is 50 ppb or more and 500 ppb or less with respect to the total amount of said liquid seasoning.

4. The liquid seasoning according to claim 1,
wherein a content of said whole and/or pulverized sesame seed is 1 to 40% by mass with respect to the total amount of said liquid seasoning.

5. The liquid seasoning according to claim 1,
wherein said liquid seasoning is an oil-in-water emulsified liquid seasoning.

6. The liquid seasoning according to claim 1,
further comprising a yeast extract.

7. The liquid seasoning according to claim 6,
wherein a content of said yeast extract is 0.01 to 2% by mass with respect to the total amount of said liquid seasoning.

8. The liquid seasoning according to claim 6,
wherein a content of said yeast extract (% by mass)/a total content (ppb) of said linear alkanethiol and said dimethylpyrazine is 0.00005 to 0.01.

9. The liquid seasoning according to claim 1,
wherein the content of said linear alkanethiol is 60 ppb or more and 300 ppb or less with respect to the total amount of said liquid seasoning, and
the content of said dimethylpyrazine is 10 ppb or more and 800 ppb or less with respect to the total amount of said liquid seasoning.

* * * * *